ID  US010906389B2

(12) United States Patent
Herlem et al.

(10) Patent No.: US 10,906,389 B2
(45) Date of Patent: Feb. 2, 2021

(54) DEVICE FOR SEALING A MOTOR VEHICLE FRONT FACE AIR INTAKE AND METHOD FOR MANUFACTURING SAME

(71) Applicant: Valeo Systemes Thermiques, Le Mesnil-Saint-Denis (FR)

(72) Inventors: Jean-Paul Herlem, Le Mesnil Saint Denis (FR); Stephan Andre, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 0 days.

(21) Appl. No.: 16/479,031

(22) PCT Filed: Jan. 3, 2018

(86) PCT No.: PCT/FR2018/050010
§ 371 (c)(1),
(2) Date: Jul. 18, 2019

(87) PCT Pub. No.: WO2018/134494
PCT Pub. Date: Jul. 26, 2018

(65) Prior Publication Data
US 2019/0329646 A1    Oct. 31, 2019

(30) Foreign Application Priority Data

Jan. 18, 2017 (FR) .................................... 17 50392

(51) Int. Cl.
*B60K 11/08* (2006.01)
(52) U.S. Cl.
CPC .................. *B60K 11/085* (2013.01)
(58) Field of Classification Search
CPC ....... B60K 11/085; B60K 11/08; B60K 11/02; B60K 11/04; B60K 11/06; B60K 11/00
(Continued)

(56) References Cited

U.S. PATENT DOCUMENTS 4,753,288 A * 6/1988 Harvey ................ B60K 11/085
  123/41.04
9,447,719 B2 * 9/2016 Kiener .................... F28F 27/02
(Continued)

FOREIGN PATENT DOCUMENTS

DE        3605064 A1    8/1987
DE   102013007158 A1   11/2013
EP        0500430 A1    8/1992

OTHER PUBLICATIONS

International Search Report and Written Opinion issued in corresponding International Patent Application No. PCT/FR2018/050010, dated May 5, 2018 (11 pages).

*Primary Examiner* — John D Walters
(74) *Attorney, Agent, or Firm* — Osha Bergman Watanabe & Burton LLP (57) ABSTRACT

The present invention relates to a device (1) for sealing a motor vehicle front face air intake, comprising:
  a supporting frame (5) in which is installed at least one set of flaps (3) pivoting about pivot pins (A),
  at least one control element (13) configured to control the positioning of the flaps (3),
  the supporting frame (5) including at least one row of bearings (51) receiving the pivot pins (A) arranged on a side pillar (5b),
  the sealing device (1) including at least one locking element (60) covering a row of bearings (51),
  said locking element (60) comprising a body and at least one connection member (61) including a base connecting it to said body of the locking element (60) and a head wider than said base,
  said side pillar (5b) including at least one slot (52) opening onto an outer side of said side pillar (5b) and preferably having a shape complementing said at least
  (Continued)

one connection member (61), said at least one connection member (61) being inserted into the at least one slot (52).

9 Claims, 8 Drawing Sheets

(58) Field of Classification Search
USPC .................. 180/68.1, 68.2, 68.3, 68.4, 68.6
See application file for complete search history.

(56) References Cited

U.S. PATENT DOCUMENTS

| | | | |
|---|---|---|---|
| 9,694,669 B2* | 7/2017 | Ruppert | B60K 11/085 |
| 9,987,919 B2* | 6/2018 | Knauer | B60K 11/085 |
| 2014/0216834 A1* | 8/2014 | Elliott | B60K 11/085 |
| | | | 180/68.1 |

* cited by examiner

DEVICE FOR SEALING A MOTOR VEHICLE FRONT FACE AIR INTAKE AND METHOD FOR MANUFACTURING SAME

The present invention relates to sealing devices and more specifically to a device for sealing a motor vehicle front face air intake, together with the manufacturing method thereof.

Motor vehicle front faces are generally made up of two main air intakes known as the upper channel and the lower channel. These air intakes are generally separated by a bumper member. The heat exchangers of the motor vehicle are placed behind this bumper member, such as for example the heat exchanger used for the passenger compartment air conditioning and/or the heat exchanger used for engine cooling.

It is also known to arrange a supporting frame including a plurality of flaps mounted pivoting about parallel axes and capable of adopting a plurality of different angular positions between an open position and a closed position, under the action of appropriate control means, in the air stream passing through the main air intakes, more generally the lower channel.

A sealing device is thus obtained that is similar to a slatted blind and that makes it possible to adjust the air flow rate passing through air intakes and reaching the heat exchangers. It is thus possible to optimize the efficacy of these heat exchangers depending on the requirements and by varying the quantity of air that they receive. In addition, at high speeds, the flaps in the closed position make it possible to reduce the drag coefficient of the vehicle and thus improve the aerodynamics of said vehicle.

The flaps are generally arranged in the bearings on the supporting frame and securing them can be problematic and complicated, particularly during the manufacturing of the sealing device or during a servicing or repair operation.

One of the aims of the present invention is therefore to at least partially overcome the drawbacks of the prior art and propose an improved sealing device, particularly with regard to the securing of the flaps, together with the manufacturing method thereof.

The present invention therefore relates to a device for sealing a motor vehicle front face air intake, comprising:
  a supporting frame in which is installed at least one set of flaps pivoting about pivot pins between a closed position and an open position,
  at least one control element configured to control the positioning of the flaps,
  the supporting frame including at least one row of bearings receiving the pivot pins of the flaps arranged on a side pillar,
  the sealing device including at least one locking element covering one row of bearings and holding the pivot pins of the flaps in said bearings,
  said locking element comprising a body and at least one connection member including a base connecting it to said body of the locking element and a head wider than said base,
  said side pillar including, on the face thereof comprising the at least one row of bearings, at least one slot opening onto an outer side of said side pillar and preferably having a shape complementing said at least one connection member, said at least one connection member being inserted into the at least one slot.

Such securing of the flaps 3 by means of such a locking element enables simpler, quick mounting of the sealing device as it does not require the use of specific tools to hold the flaps in the bearings.

According to one aspect of the invention, the connection member projects from the body of the locking element.

According to one aspect of the invention, the at least one connection member is generally T-shaped.

According to another aspect of the invention, the locking element is secured to the supporting frame comprising the row of bearings by a snap fitting so as to retain the at least one connection member in the at least one slot.

According to another aspect of the invention, the snap fitting includes a flexible tab a first end of which includes an end piece projecting towards the outside of the supporting frame and a second end of which is connected to said supporting frame, said end piece being intended for being inserted into an opening made in the locking element.

According to another aspect of the invention, the snap fitting includes a flexible tab a first end of which includes an end piece projecting from the locking element and a second end of which is connected to said locking element, said end piece being intended for being inserted into an opening made in the supporting frame.

According to another aspect of the invention, the flaps include flanges at the ends thereof and the locking element includes hemispherical cheeks covering the flanges of said flaps.

According to another aspect of the invention, the at least one row of bearings is made on the front face of the supporting frame.

The present invention also relates to a method for manufacturing a sealing device as previously described, and including, after the flaps have been mounted on the supporting frame, the following steps:
  placing the at least one connection member of the locking element and the at least one slot of the supporting frame facing each other,
  translating the locking element so that the at least one connection member is inserted into the at least one slot and so that the locking element covers a row of bearings.

Further features and advantages of the invention will become apparent on reading the following description, given as a non-limitative illustration and with reference to the attached drawings, in which.

Identical elements in the different figures have the same reference signs.

The following embodiments are examples. Although the description refers to one or more embodiments, this does not necessarily mean that each reference relates to the same embodiment, or that the features only apply to a single embodiment. Single features of different embodiments may also be combined or interchanged to provide other embodiments.

In the present description, certain elements or parameters can be given ordinal numbers, such as for example first element or second element, as well as first parameter and second parameter, or first criterion and second criterion, etc. In this case, the ordinal numbers are simply given to differentiate between and name elements or parameters or criteria that are similar but not identical. This ordinal numbering does not imply that any element, parameter or criterion has priority over another and such names can easily be interchanged without departing from the scope of the present description. Equally, this ordinal numbering does not imply an order in time, for example, for assessing such and such a criterion.

In FIGS. 1 to 6 and 12 to 15, a three-dimensional reference system XYZ shows the orientation of the different parts particularly when they are mounted on a motor vehicle. The axes of this three-dimensional reference system can thus correspond to the different orientations of the motor vehicle. The X axis can thus correspond to the length of the vehicle, the vector X indicating the front of the vehicle. The Y axis can correspond to the width of the vehicle and the Z axis to the height thereof.

Figure 1:
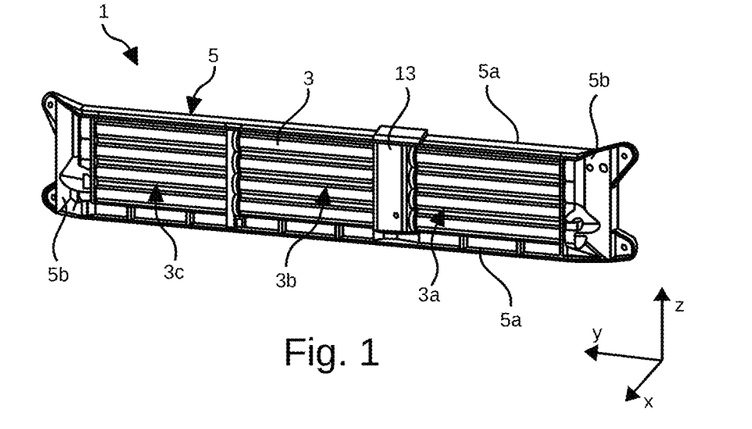
FIG. 1 shows a front perspective schematic representation of a sealing device in the closed position.

FIG. 1 shows a front perspective schematic representation of a sealing device 1 in the closed position. This FIG. 1 shows more precisely the outer face of the sealing device 1, that is, the face turned towards the outside of the motor vehicle when the sealing device 1 is assembled on the vehicle. The sealing device 1 is arranged on the front face of the motor vehicle, in front of heat exchangers such as a radiator, or other heat exchangers such as for example an intercooler, or a condenser of an air conditioning circuit.

The sealing device 1 includes a supporting frame 5 comprising in particular two longitudinal cross members 5a, extending parallel to the Y axis of the three-dimensional reference system, and at least two side pillars 5b, extending parallel to the Z axis of the three-dimensional reference system, and connecting the longitudinal cross members 5a. The supporting frame 5 is for example made from plastic. The two longitudinal cross members 5a and the at least two side pillars 5b are thus molded. In order to improve the stiffness of the supporting frame 5, it can be molded in one piece. The supporting frame 5 includes in particular a front face, i.e. that is oriented towards the front of the motor vehicle, along the vector X of the three-dimensional reference system, and a rear face, i.e. that is oriented towards the rear of the motor vehicle, in the opposite direction to the vector X of the three-dimensional reference system.

A plurality of flaps 3 is installed inside the supporting frame 5, which form rows of flaps 3 parallel to each other and form sets 3a, 3b and 3c of flaps 3. The sealing device 1 also includes a control element 13 configured to control the rotation of the flap or flaps 3 about a pivot pin A, between an open position, in which the flaps 3 are positioned so that an air flow can pass through the sealing device 1, particularly inside the supporting frame 5, and a closed position shown in FIG. 1, in which the flaps 3 are positioned so that an air flow cannot pass through the sealing device 1. The control element 13 can be arranged on a side of the sealing device 1, on a side pillar 5b, or between two sets of flaps 3 as shown in FIG. 1.

FIG. 1 more specifically shows a sealing device 1 comprising three sets 3a, 3b and 3c of flaps 3.

Figure 2:
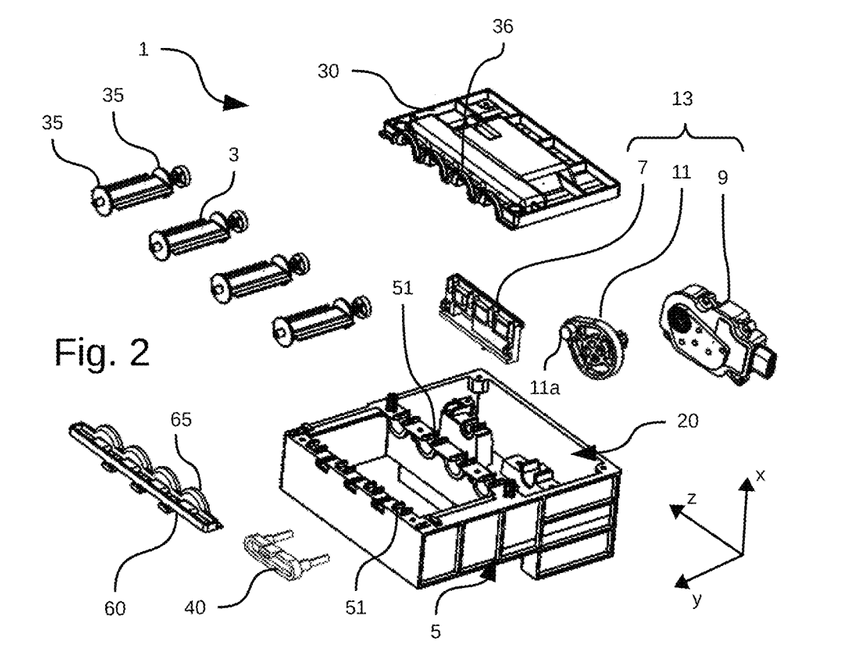
FIG. 2 shows an exploded perspective schematic representation of a sealing device.

As shown in FIG. 2, which is an exploded schematic representation of a sealing device 1, the control element 13 includes in particular at least one control member 7 connected to the flaps 3, an actuator 9, and a lever 11 connected to the actuator 9 and to the control member 7 so that it can pivot the flaps 3.

The supporting frame 5 includes a recess 20 in which the control element 13 and all of the elements thereof are arranged. The recess 20 includes an opening on the front face of the supporting frame 5. The recess 20 is blind, i.e. it includes a bottom on the rear face of the supporting frame 5. A cover 30 covers the opening of the recess 20 on the front face of the supporting frame 5 in order to protect the control element 13.

The fact that the recess 20 includes an opening on the front face of the supporting frame 5 firstly gives easier access to the control element 13, particularly in the event of a repair or servicing operation. The actuator 9, the lever 11 and the control member 7 can thus be accessed directly through the front of the vehicle, which avoids having to completely remove the sealing device 1 from the motor vehicle in order to access it.

The opening of the recess 20 is in particular large enough for all of the elements of the control element 13 to be installed and removed.

The supporting frame 5 also includes at least two parallel rows of bearings 51 for engaging the pivot pins A of the flaps 3. These rows of bearings 51 are arranged on the supporting frame 5 so that they receive the pivot pins A of the flaps 3. A row of bearings 51 is arranged on either side of each set of flaps 3. More particularly, these rows of bearings 51 are parallel to the Z axis of the three-dimensional reference system and arranged on the front face of the supporting frame 5.

The fact that the bearings 51 are arranged on the front face of the supporting frame 5 thus makes it possible to mount the flaps 3 through the front of the supporting frame 5. In the same way as the elements present in the recess 20, the flaps 3 can thus be accessed directly through the front of the vehicle, which avoids having to completely remove the sealing device 1 from the motor vehicle in order to access them, particularly in the event of a repair or servicing operation. In addition, when the motor vehicle is moving, the flaps 3 are pressed against the supporting frame 5 and the securing thereof to said frame has less need to be strong enough to resist the pressure exerted by the air.

Figure 3:
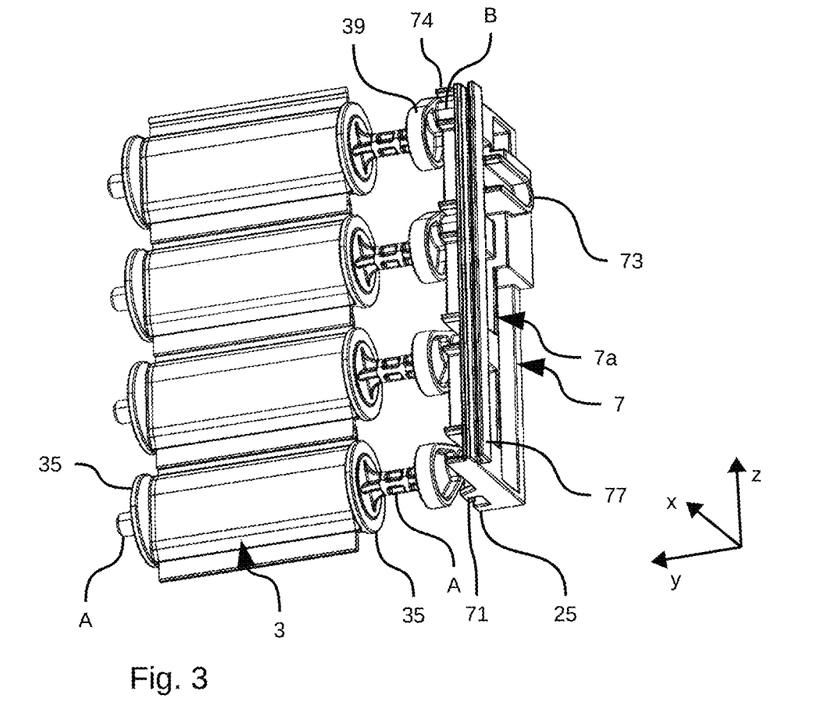
FIG. 3 shows a perspective schematic representation of the connection between a set of flaps and a control member.

FIG. 3 shows the connection between the flaps 3 and the control member 7 in more detail. The flaps 3 each include a control arm 39, perpendicular to their pivot pin A and holding a connecting pin B enabling the connection between said control arm 39 and the control member 7. The control arm 39 is generally integrally formed with the flaps 3.

The flaps 3 can each pivot about their pivot pin A defined by their connection to the supporting frame 5 at the bearings 51. The connecting pins B between the flaps 3 and the control member 7 are eccentric relative to the pivot pins A so that a translation, parallel to the Z axis of the three-dimensional reference system, of the control member 7, under the action of the actuator 9, results in the pivoting of the flaps 3 about their respective pivot pins A and therefore the switching of said flaps 3 from one position to another.

As all of the flaps 3 are connected to the same control member 7, the switch from an open position to a closed position is synchronous for all of the flaps 3.

Figure 4:
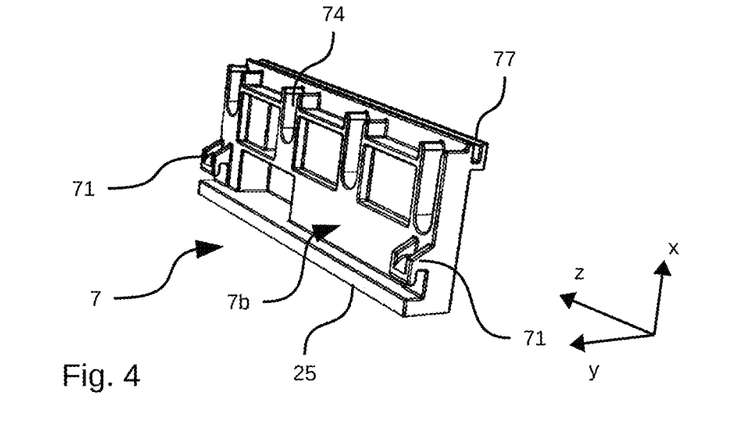
FIG. 4 shows a perspective schematic representation of a control member.

As shown in FIGS. 3 and 4, the control member 7 includes on a first face 7a (visible in FIG. 3), a first oblong recess 73 the long axis of which is oriented parallel to the X axis and perpendicular to the movement of the control member 7. This first face 7a is intended for being oriented towards the inside of the recess 20 and this first oblong recess 73 is intended for receiving a stud 11a of the lever 11. This first oblong recess 73 is in particular arranged on a face of the control member 7 opposite the face thereof connected to the flaps 3. The first oblong recess 73 can in particular be open on one of the short sides thereof in order to facilitate the mounting and insertion of the lever 11 into the first oblong recess 73.

The fact that the first oblong recess 73 has this oblong shape makes it possible to convert and transfer the rotation of the lever 11 into a straight translation of the control member 7 without there being any depthwise movement (along the X axis) of the control member 7. On the translation of the control member 7, the lever 11 can thus move in the first oblong recess 73 along the long axis thereof and translate the control member 7.

The control member 7 can also include on a second face 7b (visible in FIG. 4) at least one second oblong recess 74 the long axis of which is also oriented perpendicular to the first sliding connection. This second face 7b is intended for being oriented towards the outside of the recess 20 in the direction of the flaps 3. The second oblong recesses 74 are intended for being connected to a flap 3, more precisely to its connecting pin B. These second oblong recesses 74 can in particular be open on one of the short sides thereof in order to facilitate the mounting and insertion of the connecting pins B. On the translation of the control member 7, the connecting pins B of the flaps 3 can thus move in the second oblong recesses 74 along the long axes thereof and transform the straight translation of the control member 7 into a rotation of the control arm 39 about the axis of rotation A and thus pivot the flaps 3.

All of the flaps 3 are connected to the same control member 7, the switch from an open position to a closed position is synchronous for all of the flaps 3. In FIGS. 2 to 4, the example of a control member 7 is a single control member 7 that only controls one set of flaps 3 arranged on a single side of the control element 13. If there is a set of flaps 3 present on either side of the control element 13, as in FIG. 1, the control member 7 can have a U-shaped cross-section (not shown) with second oblong recesses 74 arranged on the two arms of the U in order to control the two sets of flaps 3 simultaneously. A cross member connects the two arms of the U and makes it possible to transmit a synchronous movement to the two sets of flaps 3. In addition, this U-shaped cross-section makes it possible to surmount the actuator 9 and the lever 11, which are arranged in the recess 20 between the arms of the U.

Figure 5:
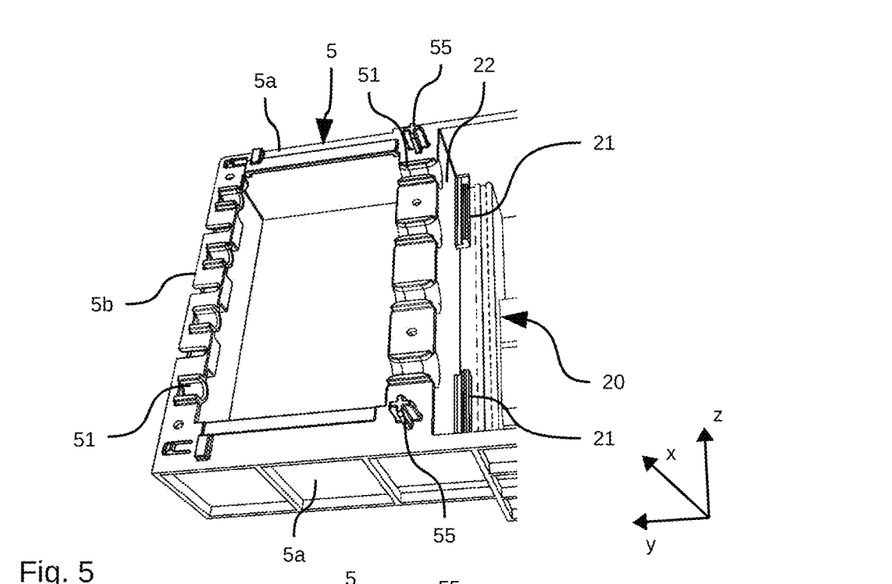
FIGS. 5 and 6 show a partial perspective schematic representation of a supporting frame and the recess thereof.
Figure 6:
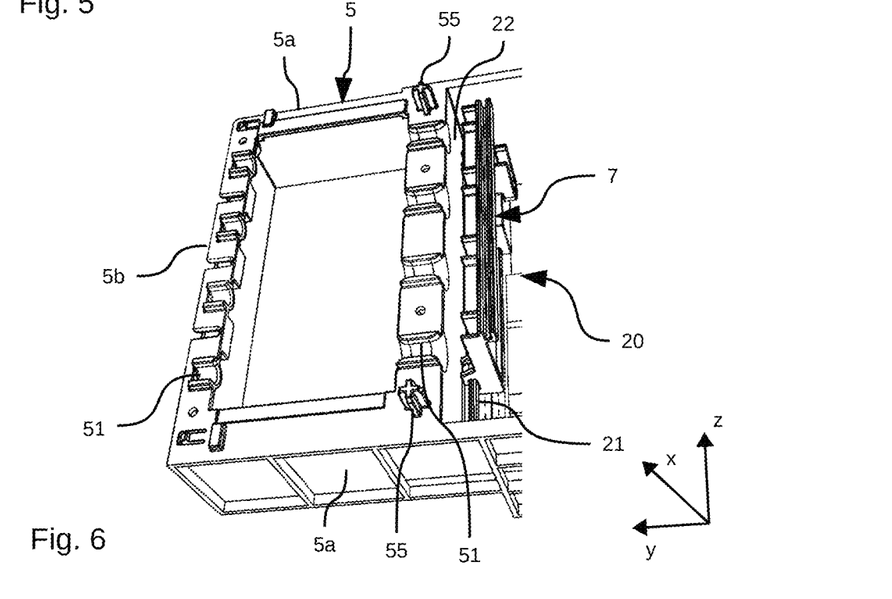

As shown in FIGS. 5 and 6, the control member 7 is mounted inside the recess 20 by a first sliding connection, made between an inner side wall 22 of said recess 20 and said control member 7. Here, inner side wall 22 is given to mean that the face of the side wall 22 of the recess 20 holding the first sliding connection is one of the inner faces thereof situated in the plane formed by the X and Z axes, situated inside the recess 22. This first sliding connection is configured to limit the depthwise (along the X axis) and lateral (along the Y axis) movements of the control member 7 and to guide it in the translation thereof (along the Z axis).

The first sliding connection includes at least one lug 71 arranged on the control member 7 (visible in FIGS. 3 and 4) and engaging with at least one rail 21 (visible in FIG. 5) arranged on the side wall 22 of the recess 20 so as to restrict the lateral movements (along the Y axis) of the control member 7 and guide the translation thereof (along the Z axis). However, it is entirely possible to envisage, without departing from the scope of the invention, a reverse arrangement in which the rail 21 is arranged on the control member 7 and in which the at least one lug 71 is arranged on the inner side wall 22.

In the example shown in FIGS. 3 to 6, the sliding connection includes two lugs 71, each lug 71 being connected to a dedicated rail 21. The rails 21 are aligned and separated by a gap. The lugs 71 are also separated for satisfactory stability and improved guidance of the control member 7.

The first sliding connection also includes at least one guard rail 25 parallel to the rail 21 and configured to restrict the vertical movements (along the X axis) of the control member 7. The guard rail 25 can be arranged on the same element as a lug 71, here the control member 7, as shown in FIGS. 3 and 4. In this case, the rail 21 is then clamped between the lug 71 and the guard rail 25. However, it is entirely possible to envisage another case in which the guard rail 25 can be arranged on the same element as a rail 21. In this case, the lug 71 is then arranged between the rail 21 and the guard rail 25.

The lug 71 preferably has a hook-shaped cross-section, arranged on an edge of the control member 7 or on the inner side wall 22 as the case may be, and the end of which slides in the rail 21.

In the case described above and shown in FIGS. 3 to 6, in which the control member 7 includes two lugs 71 together with a guard rail 25, and in which the recess 20 includes two aligned and separated rails 21, said control member 7 can be put in place according to the following steps:

firstly, the control member 7 is placed in the recess 20 in a so-called end position in which the lugs 71 are aligned with the ends of the rails 21, secondly, the control member is translated so that the lugs 71 slide against the rails 21. The rails 21 are then arranged between the lugs 71 and the guard rail 21.

In operation, the translation stroke (along the Z axis) of the control member 7 driven by the actuator 9 is shorter than the length of the rails 21, which prevents it from coming off said rails 21.

The control member 7 can also include a second sliding connection to the cover 30 intended for covering the recess 20. This second sliding connection makes it possible to increase the guidance of the control member 7 and restrict the lateral movements thereof (along the Y axis).

This second sliding connection can in particular include a slot 77, parallel to the first connection, intended for receiving a lug. In the example shown in FIGS. 3 and 4, the slot 77 of the second sliding connection is arranged on the control member 7 and the lug (not shown) is arranged on the cover 30, more precisely on the inner face thereof, i.e. on the face thereof covering the recess 20.

Such a connection between the control member 7 and the supporting frame 5 inside the control element 13 can equally be made in the context of a control element 13 including a recess 20 having its opening on the front face of the supporting frame 5 as described here, but also for any other type of control element 13.

Such a control member 7 constantly keeps a straight translation that makes it possible to make a control element 13 that is as shallow as possible (along the X axis of the three-dimensional reference system).

Figure 7:
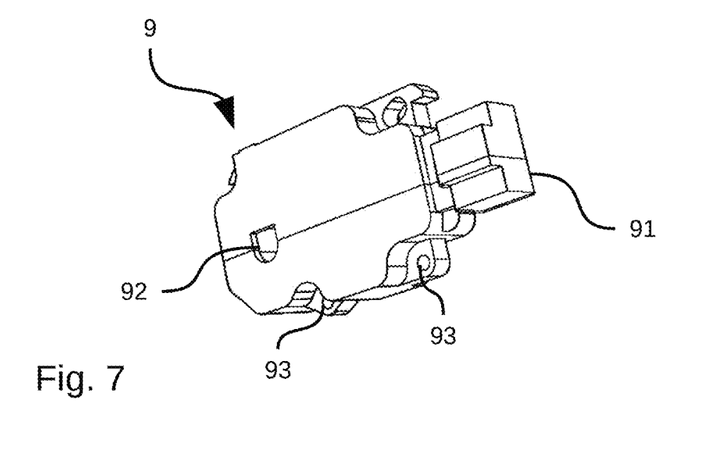
FIG. 7 shows a perspective schematic representation of an actuator.

The actuator 9, shown in more detail in FIG. 7, can be electric, such as for example an electric motor. The actuator 9 applies a translation to the control member 7 by means of the lever 11. This translation takes place along the Z axis of the three-dimensional reference system. The actuator 9 can more particularly comprise an electric plug 91 together with an orifice 92 for coupling to the lever 11. This coupling orifice 92 particularly makes it possible to rotate the lever 11.

Figure 8:
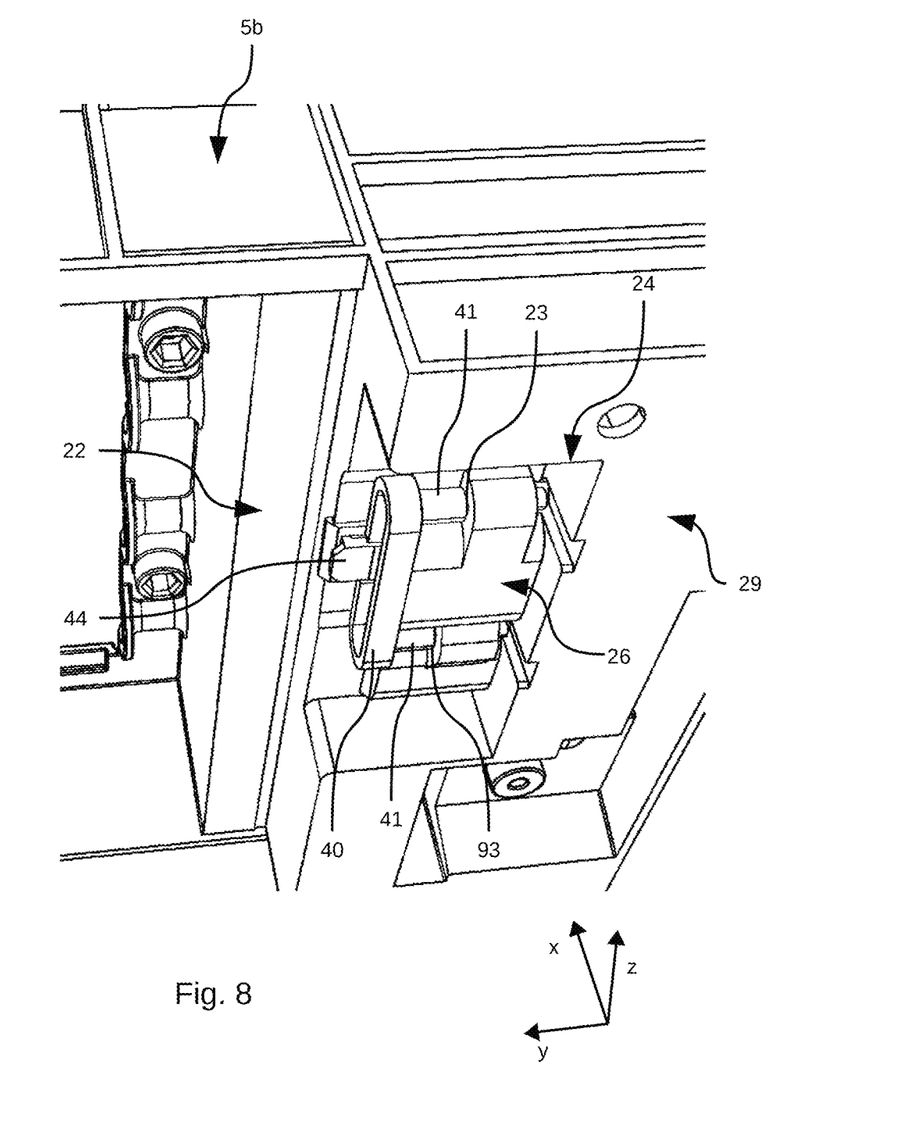
FIG. 8 shows a partial perspective schematic representation of the securing of an actuator according to a first embodiment.

According to a first embodiment, the actuator 9 can be secured inside the recess 20. This first embodiment is shown in FIG. 8, which shows the rear of the recess 20 and more precisely the rear face of the bottom 29 thereof. The rear of the recess 20 includes at least two first orifices 23 arranged on a plane perpendicular to the plane formed by the X and Y axes of the three-dimensional reference system. The actuator 9 includes at least two second securing orifices 93 (visible in FIG. 7) intended for facing the first orifices 23. The actuator 9 is secured by inserting, from the outside of the recess 20, a bar 40 including at least two rods 41 that pass through the first 23 and second 93 orifices.

The recess 20 can in particular include on the outer face of the bottom 29 thereof a cavity 24 intended for receiving the bar 40 for improved integration. This cavity 24 can also include on the inner face of the bottom 29 of the recess 20 a hollow 26 (visible from beneath in FIG. 8) holding the at least two first orifices 23 and into which the actuator 9 is inserted so that the first 23 and second 93 orifices are facing each other.

The bar 40 can also be connected to the outer wall of the recess 20 and more precisely to the outer face of the bottom of the recess 20 by a snap fitting 44 in order to lock the translation of said bar 40.

However, it is entirely possible to envisage other means of securing the actuator 9 in the recess 20. The use of a bar 40 nonetheless enables quick mounting and easier removal if necessary.

Figure 9:
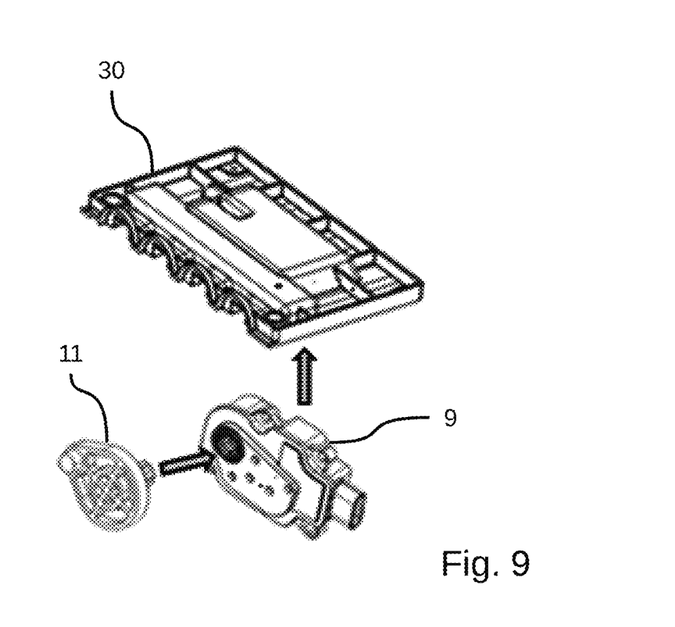
FIG. 9 shows a perspective schematic representation of the securing of an actuator according to a second embodiment.

According to a second embodiment shown in FIG. 9, the actuator 9 can be secured on the inner face of the cover 30. The actuator 9 can be secured to the cover 30 by any type of fastening, for example by gluing, fitting, or by means of screws or rivets.

The cover 30 can be secured to the supporting frame 5 above the opening of the recess 20 by a snap fitting, for example by means of spurs 55 fitting into dedicated orifices 39 (visible in FIGS. 10 and 11) on the cover 30. Such a "weak" fastening is possible because the opening of the recess 20 and the cover 30 are arranged on the front face of the supporting frame 5. Thus, when the vehicle is moving, the air pressure presses the cover 30 against the supporting frame 5, which reduces the stress on the fastening.

However, it is entirely possible to envisage any other securing means, for example by means of screws or rivets.

The cover 30 can also cover a row of bearings 51. As a result, when the flaps 3 are installed and the pivot pins A are inserted into the bearings 51, the cover 30 can hold one end of the flaps 3.

Figure 10:
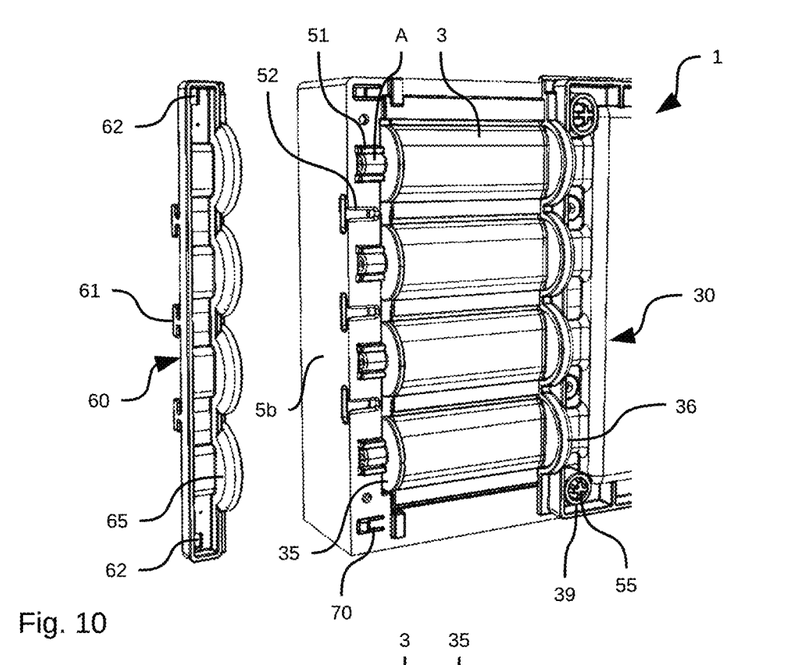
FIGS. 10 and 11 show a partial perspective schematic representation of a supporting frame and the securing of the flaps.
Figure 11:
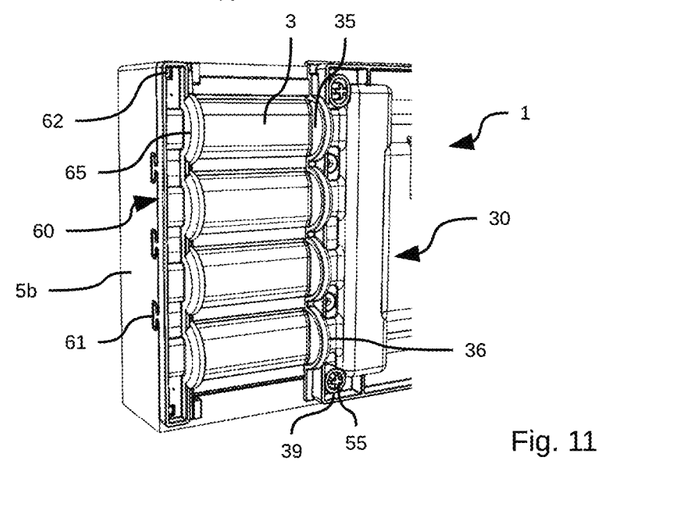

In order to hold the flaps 3 in the bearings 51 on the side pillars 5b of the supporting frame 5, particularly in the bearings not covered by the cover 30, the sealing device 1 can include at least one locking element 60, as shown in FIGS. 2, 10 and 11. This locking element 60 covers a row of bearings 51 and holds the pivot pins A of the flaps 3 in said bearings 51.

The locking element 60 comprises a body that can thus be a rigid strip secured to the supporting frame 5. For this securing to the supporting frame, the locking element 60 can include at least one connection member 61 projecting from said locking element 60. This connection member 61 more particularly includes a base connecting it to said locking element 60 and a head wider than said base. Preferably, the connection member 61 is generally T-shaped.

In a complementary manner, the side pillar 5b includes, on the face thereof comprising the at least one row of bearings 51, at least one slot 52 opening onto an outer side of said side pillar 5b. This slot 52 has a shape complementing the connection member 61. As shown in FIG. 11, the connection members 61 are inserted into the slots 52 to hold the flaps 3.

The locking element 60 is preferably secured to the supporting frame 5 comprising the row of bearings 51 so that it does not come out of the slots 52. This securing can be carried out by a snap fitting. This snap fitting can in particular include a flexible tab 70 a first end of which includes an end piece projecting towards the outside of the supporting frame 5 and a second end of which is connected to said supporting frame 5. This end piece is intended for being inserted into an opening 62 made in the locking element 60. This end piece more particularly includes a bevel enabling the assembly by translation of the locking element 60 on the side pillar 5b by deforming the flexible tab 70 until the end piece is inserted into the opening 62. The end piece also includes a flat surface that is opposite the bevel and that forms an obstacle to the removal of the locking element 60 from the side pillar by translation.

It is also entirely possible to envisage a reverse snap fitting in which the flexible tab 70 and the end piece thereof are arranged on the locking element 60 and in which the end piece is intended for being inserted into an opening made in the supporting frame 5.

The locking element 60 is put in place after the flaps 3 have been mounted on the supporting frame 5. This putting in place consists firstly of placing the at least one connection member 61 of the locking element 60 facing the at least one slot 52 of the supporting frame 5. Next, the locking element 60 is translated so that the at least one connection member 61 is inserted into the at least one slot 52 and so that the locking element 60 covers the row of bearings 51.

Such securing of the flaps 3 by means of such a locking element 60 enables simpler, quick mounting of the sealing device 1 as it does not require the use of specific tools to hold the flaps 3 in the bearings 51. In addition, such securing remains reversible without damaging the supporting frame 5, the flaps 3, or the locking element 60 itself. This is advantageous if a repair is required on the sealing device 1.

Such securing of the flaps 3 can equally be carried out in the context of a sealing device 1 the at least one row of bearings 51 of which is made on the front face of the supporting frame 5 as described here, but also for any other type of sealing device 1.

As shown in FIGS. 2, 3 and 10, the flaps 3 can include flanges 35 at the ends thereof. In a complementary manner, the locking element 60 can include hemispherical cheeks 65 covering the flanges 35 of the flaps 3, more particularly at the ends and the pivot pins A of the flaps 3 that said locking element 60 holds. Likewise, the cover 30 can also include hemispherical cheeks 36 covering the flanges 35 of the flaps 3, more particularly at the ends and the pivot pins A of the flaps 3 that said cover covers. These flanges 35 and these hemispherical cheeks 65, 36 form a protective barrier that reduces the quantity of dust and debris that could reach the bearings 51 and the inside of the recess 20 and that could seize the pivoting of the flaps 3.

The present invention also relates to a method for manufacturing a device 1 for sealing a motor vehicle front face air intake as previously described.

Figure 12:
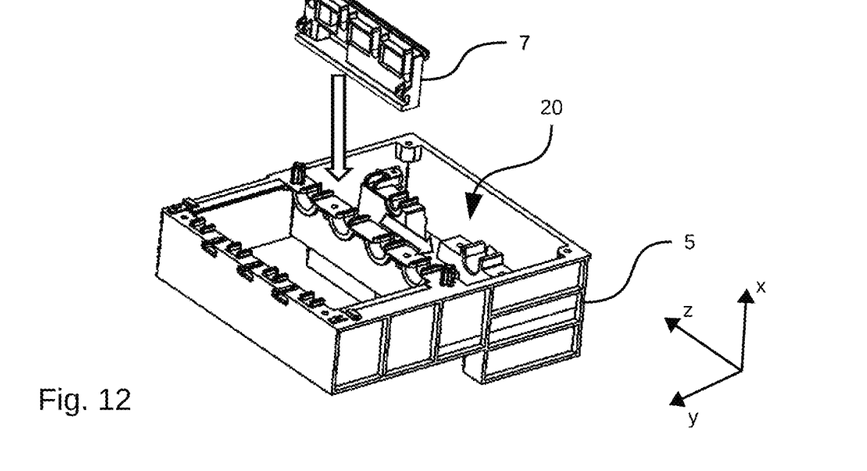
FIGS. 12 to 15 show a perspective schematic representation of a sealing device according to different steps of the manufacturing method thereof.
Figure 13:
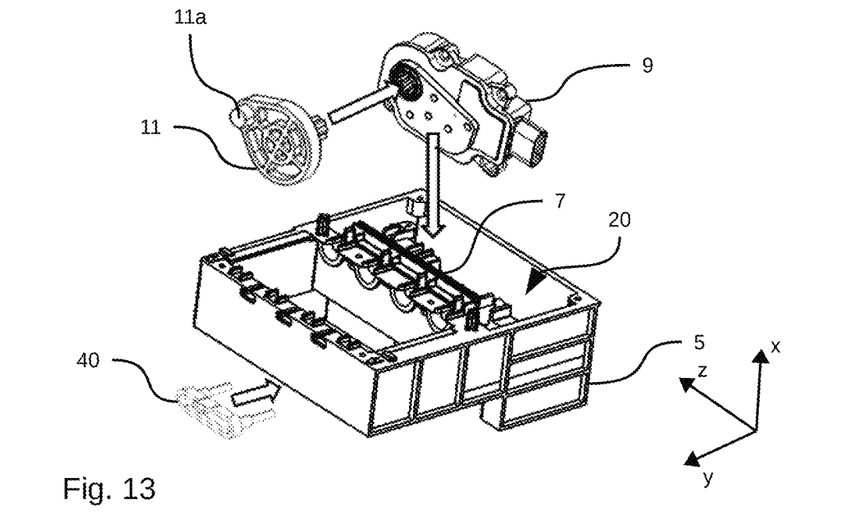

According to a first embodiment of this manufacturing method, the method particularly comprises:
- a first step, shown in FIG. 12, of installing the at least one control member 7 in the recess 20 through the opening in the front face thereof,
- a second step, shown in FIG. 13, of securing the actuator 9 provided with the lever 11 in the recess 20, and putting in place the connection between the lever 11 and the control member 7. In this second step, it is important that the actuator 9 and the lever 9 are assembled to each other in advance in order to enable easy mounting without difficult maneuvers,
- a third step, shown in FIG. 14, of installing the flaps 3 in the bearings 51 and putting in place the connection between the flaps 3 and the control member 7, on the control arms 39, and
- a fourth step, shown in FIG. 15, of securing the flaps 3 by:
  - putting in place and securing the cover 30 on the supporting frame 5 so as to close the recess, and
  - putting in place and securing the at least one locking element 60.

Figure 14:
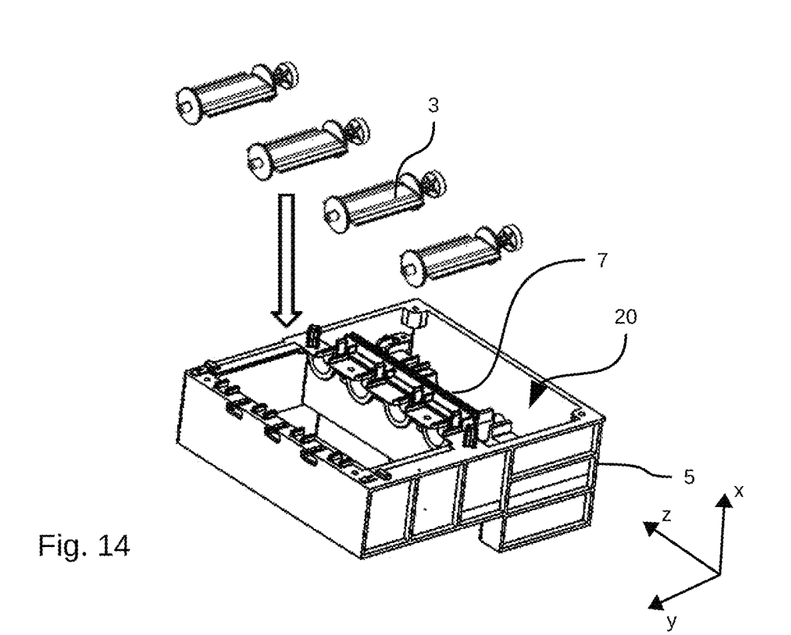
Figure 15:
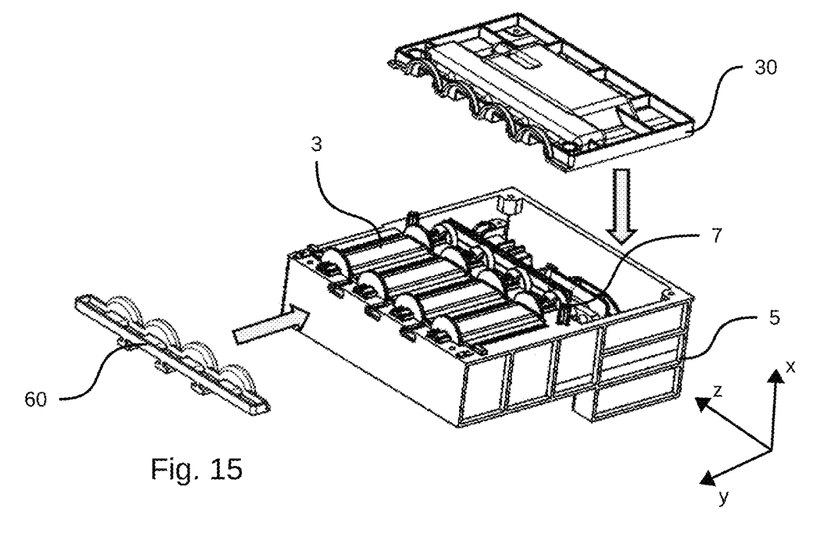

According to a second embodiment of this manufacturing method, the method particularly comprises:
- a first step, shown in FIG. 12, of installing the at least one control member 7 in the recess 20 through the opening in the front face thereof,
- a second step, shown in FIG. 14, of installing the flaps 3 in the bearings 51 and putting in place the connection between the flaps 3 and the control member 7, on the control arms 39, and
- a third step of securing the flaps 3 comprising:
  - a first sub-step of securing the actuator 9 provided with the lever 11 on the inner face of the cover 30 as shown in FIG. 9,
  - a second sub-step of putting in place and securing the cover 30 on the supporting frame 5 so as to close the recess 20 and so that the connection between the lever 11 and the control member 7 can be made, and
  - a third sub-step of putting in place and securing the at least one locking element 60.

It can thus clearly be seen that due to the presence of the locking element 60, the flaps 3 are easily secured and arranged in the bearings 51. In addition, the removal and remounting of the flaps is facilitated in the event of a servicing or repair operation due to the locking element 60.

The invention claimed is:

1. A device for sealing a motor vehicle front face air intake, comprising:
   a supporting frame in which is installed at least one set of flaps pivoting about pivot pins between a closed position and an open position;
   at least one control element configured to control the positioning of the flaps,
   the supporting frame including at least one row of bearings receiving the pivot pins of the flaps arranged on a side pillar,
   wherein the sealing device includes at least one locking element covering one row of bearings and holding the pivot pins of the flaps in said bearings,
   said locking element comprising a body and at least one connection member including a base connecting the connection member to said body of the locking element and a head wider than said base,
   said side pillar including, on the face thereof comprising the at least one row of bearings, at least one slot opening onto a lateral side of said side pillar having a shape complementing said at least one connection member, said at least one connection member being inserted into the at least one slot from the lateral side.

2. The sealing device as claimed in claim 1, in which the connection member projects from the body of the locking element.

3. The sealing device as claimed in claim 1, wherein the at least one connection member is generally T-shaped.

4. The sealing device as claimed in claim 1, characterized in that the locking element is secured to the supporting frame comprising the row of bearings by a snap fitting so as to retain the at least one connection member in the at least one slot.

5. The sealing device as claimed in claim 4, wherein the snap fitting includes a flexible tab a first end of which includes an end piece projecting towards the outside of the supporting frame and a second end of which is connected to said supporting frame, said end piece being intended for being inserted into an opening made in the locking element.

6. The sealing device as claimed in claim 4, wherein the snap fitting includes a flexible tab a first end of which includes an end piece projecting towards the outside of the locking element and a second end of which is connected to the locking element, said end piece being intended for being inserted into an opening made in the supporting frame.

7. The sealing device as claimed in claim 1, wherein the flaps include flanges at the ends thereof and the locking element includes hemispherical cheeks covering the flanges of said flaps.

8. The sealing device as claimed in claim 1, wherein the at least one row of bearings is made on the front face of the supporting frame.

9. A method for manufacturing a sealing device, the sealing device comprising a supporting frame in which is installed at least one set of flaps pivoting about pivot pins between a closed position and an open position, and at least one control element configured to control the positioning of the flaps, the supporting frame including at least one row of bearings receiving the pivot pins of the flaps arranged on a side pillar, the sealing device including at least one locking element covering one row of bearings and holding the pivot pins of the flaps in said bearings, said locking element comprising a body and at least one connection member including a base connecting the connection member to said body of the locking element and a head wider than said base, said side pillar including, on the face thereof comprising the at least one row of bearings, at least one slot opening onto a lateral side of said side pillar having a shape complementing said at least one connection member, said at least one connection member being inserted into the at least one slot from the lateral side, the method comprising:
   after the flaps have been mounted on the supporting frame, placing the at least one connection member of the locking element and the at least one slot of the supporting frame facing each other; and
   translating the locking element so that the at least one connection member is inserted into the at least one slot and so that the locking element covers a row of bearings.

* * * * *